United States Patent [19]

Kiely et al.

[11] 4,103,942
[45] Aug. 1, 1978

[54] SEAL FOR SUBMERSIBLE PIPE SWIVEL

[75] Inventors: William L. Kiely, Houston, Tex.; Kristen I. Pedersen, Armonk, N.Y.

[73] Assignee: Sotec, Inc., Tex.

[21] Appl. No.: 718,564

[22] Filed: Aug. 30, 1976

[51] Int. Cl.² .............................................. F16L 27/00
[52] U.S. Cl. ....................... 285/276; 277/30; 285/342
[58] Field of Search ................ 285/190, 224, 281, 98, 285/272, 275, 276, 278, 279, 280, 134, 342, 231, 223; 277/30; 141/100, 387

[56] References Cited

U.S. PATENT DOCUMENTS

| | | | |
|---|---|---|---|
| 1,181,143 | 5/1916 | Korfhage | 277/30 X |
| 2,460,872 | 2/1949 | Carpenter | 285/134 |
| 2,560,263 | 7/1951 | Wiegand et al. | 285/281 X |
| 2,828,980 | 4/1958 | Craig et al. | 285/231 X |
| 3,288,496 | 11/1966 | Myers | 285/276 X |
| 3,497,244 | 2/1970 | Grontom | 285/98 X |
| 3,715,134 | 2/1973 | Fallou | 285/276 |
| 3,768,840 | 10/1973 | Upton et al. | 285/272 X |
| 3,942,204 | 3/1976 | Gruy | 141/100 X |

*Primary Examiner*—Dave W. Arola
*Attorney, Agent, or Firm*—Bertram H. Mann

[57] ABSTRACT

A submersible large diameter pipe swivel is provided with seal means which is designed and adapted to allow small radial and axial relative movements (wobble) between the pipe and the swivel joint, while maintaining full integrity of the seal and which, being unaffected by such wobble, therefore offers minimum resistance to rotation.

4 Claims, 2 Drawing Figures

SEAL FOR SUBMERSIBLE PIPE SWIVEL

BACKGROUND OF THE INVENTION

In co-pending application Ser. No. 540,551, filed Jan. 13, 1975, assigned to the assignee of the present application, now U.S. Pat. No. 3,942,204, and elsewhere, there are disclosed single anchor leg mooring and fluid transfer devices including swivel joints for interconnection of the stationary fluid swivel center shaft pipe with a hose arm and the cargo hoses. The swivels are sealed against leakage between the swivel joint and the center shaft pipe by, for instance, Dresser gaskets, which must be packed sufficiently tightly to maintain the seal even when the swivel is deformed or wobbles slightly due to eccentricity or wear. Consequently, the seal may impose substantial resistance to rotation of the swivel joint and resultant excessive flexing of the cargo hoses in applying torque to the swivel joint or joints as the moored vessel swings around the buoy.

SUMMARY OF THE PRESENT INVENTION

Accordingly, it is an object of the present invention to substantially reduce the resistance to rotation of such sealed swivel joint.

Another object is to provide such a swivel with seal means which will freely allow small wobble movements between the center shaft and the swivel joint, while maintaining full integrity of the seal.

In accordance with the present invention, the swivel joint inner or stationary member is locked independently of the seal, against rotation relative to the anchor leg pipe, but free for limited axial and radial play (wobble) relative to the mounting pipe. A three element seal ring device seals the swivel inner member against ingress and egress of fluid, and is capable of limited play or wobble with the swivel both radially and axially relative to the anchor leg pipe. An adjustable sealing gasket, for instance, of the Dresser type, is interposed between a first of the seal ring members and the pipe and is held in place by a second, retainer member while the first seal ring member is held in place by a third, clamping ring member. The latter member is bolted to the stationary race of the swivel. Ample O-rings are sealingly interposed between the first ring and the confronting stationay swivel member. Additional seals are provided between the inner and outer swivel members which are not subject to varying axial or transverse compression, for instance, due to wobble, and are not adjustable between the first and third ring members, together with the Dresser gasket accomodate radial and axial play of the swivel and seal ring device, more or less as a unit. However, the adjustable seal may be tightened as needed to insure integrity of the seal without increasing the resistance to swivelling.

DETAIL DESCRIPTION OF THE DRAWINGS

Figure 1:
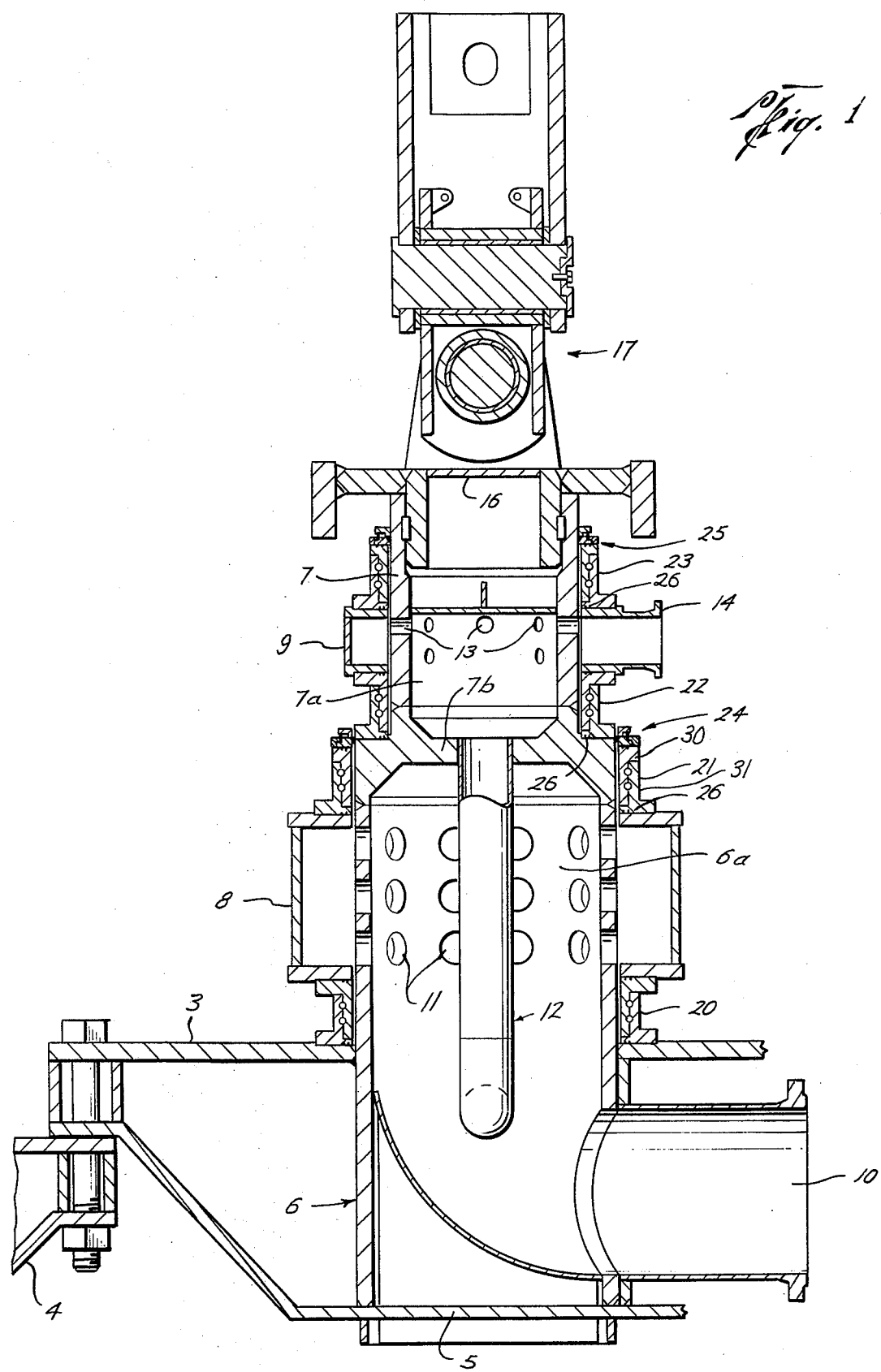
FIG. 1 is an axial cross section through a single anchor leg mooring and cargo transfer device illustrating the invention.

The single anchor leg swivel assembly has a base structure 3 including a bottom plate 5 which rests on and is secured to the mooring foundation, shown in part at 4, which rests upon the sea floor. The rugged anchor leg shaft pipe 6 projects upwardly from plate 5 and includes a reduced portion 7 which is integrally separated from lower pipe part 6 by the transverse wall 7a. Pipe parts 6 and 7 rotatably mount chambered conduit housings 8 and 9. A right angle fitting 10 connects the bottom of pipe part 6 with sea bed pipe (not shown) leading to a shore installation or elsewhere. A plurality of holes 11 in pipe part 6 connect part 6 with the interior of conduit housing 8 which, in turn, is connected by pivoted pipe arms (not shown) to cargo transfer hoses leading to the vessel being serviced. The second, chambered rotatable or swivelled housing 9 connects an axial internal pipe 12 through segregated upper pipe part 7, holes 13, and an additional hose arm 14 and hose (not shown) leading to the vessel for conducting a different fluid, for instance, bunker fuel. Internal pipe 12 connects through suitable means (not shown) to other sea bed piping. Projecting above top closure plate 16 is the universal joint, generally designated 17, for connection through a swivel and chain to the mooring buoy. All of the above is disclosed in the above-mentioned U.S. Pat. No. 3,942,204.

Figure 2:
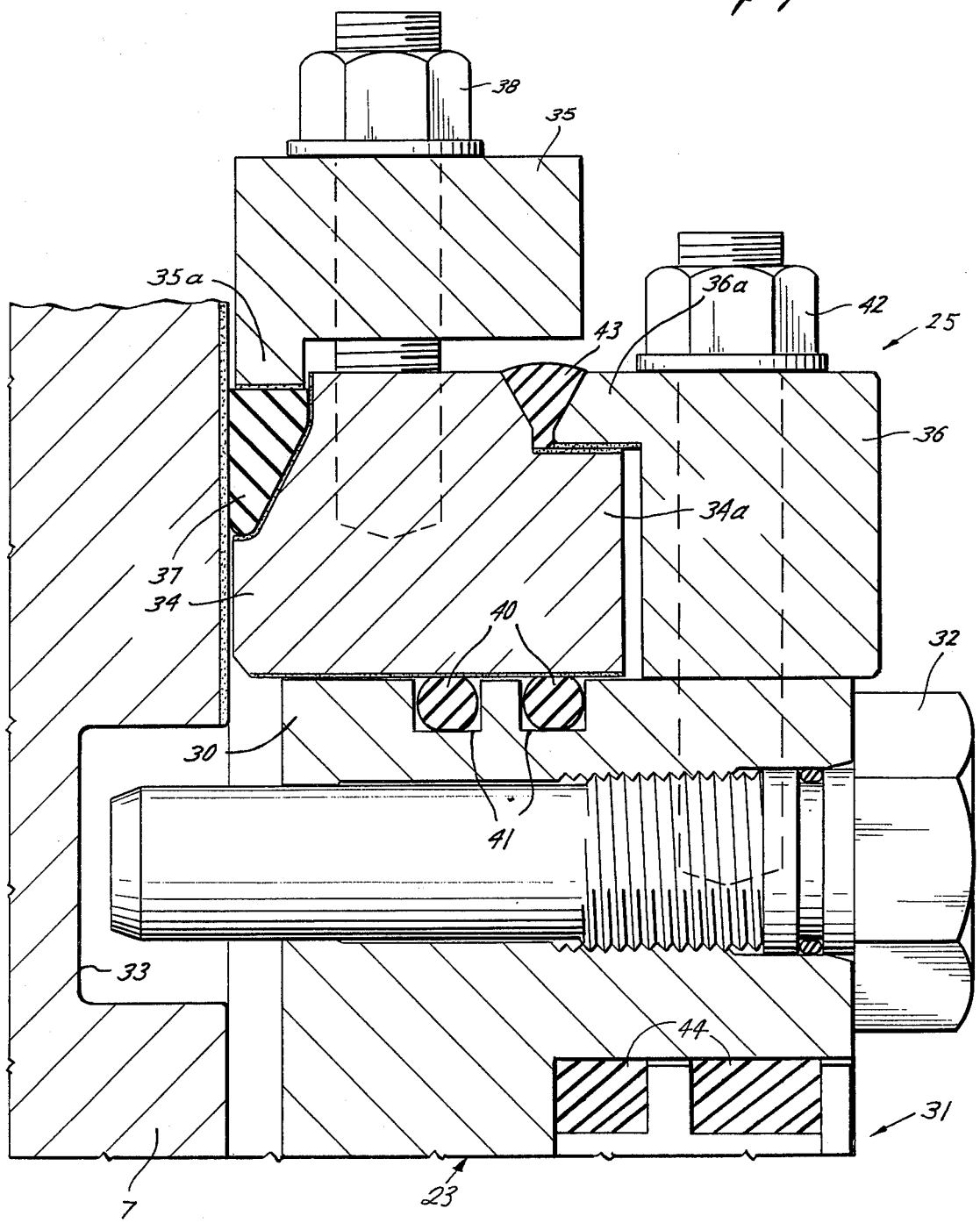
FIG. 2 is an enlarged cross sectional view illustrating swivel sealing portions of the device.

Rotatable housings 8 and 9 are mounted on center shaft parts 6 and 7 by means of swivel joints or bearings 20, 21, 22, and 23. The upper swivels 21 annd 23 are provided with upper seal units 24 and 25, which are identical, one being illustrated in detail in FIG. 2.

Inner element 30 within swivel element 31, is locked rotationally on its pipe part, for instance, 6, by a non-corroding pin 32, the end of which enters a slot 33 in the external wall of the pipe so that the swivel is free for limited axial and radial play (wobble) relative to the base pipe. Outer member 31 of the swivel at the top, has seal packings 44 rotatably engaging the confronting surface of stationary swivel member 30 and, at the bottom, is sealed against rotary housing 9, with which it moves, by seals 26 (FIG. 1). Surmounting the swivel unit is the novel 3-member seal ring unit, generally designated 25, including a first, seal-carrying ring 34, a second, seal-retaining ring 35, and a third, locking ring 36. First ring 34 has a J-bevel at its inner edge receiving the Dresser gasket packing 37 sealingly interposed between ring 34 and pipe part 7. Gasket 37 is retained in sealing tightness by an annular shoulder or ridge 35a depending from the body of second ring 35 and drawn downwardly against gasket 37 by bolts 38 threaded into first ring 34.

Sealingly interposed between the confronting surfaces of seal-carrying ring 34 and swivel stationary member 30 are ample O-rings 40 resting in grooves 41 in member 30. Ring 34 is held firmly against O-rings 40 by the third retainer ring member 36 which is secured to swivel member 30 by bolts 42 so that seal unit 25 and the swivel inner race are locked together. Mastic caulking 43 is packed between diverging corners of rings 34 and 36. The interengaging surfaces of shoulder 34a on ring 34 and flange 36a on ring 36 are of an anti-friction character, for instance, teflon impregnated.

Accordingly, swivel members 30 and 31 are free to wobble or play both radially and axially with the seal unit and relative to the anchor pipe. This "flexibility" leaves the swivel free to "run-out", i.e. to rotate eccentrically or wobble and thus avoid a tendency to deform its races or balls. The swivel outer race remains free to rotate at lower values of input torque than is required where both swivel races are forcibly restrained from exercising the tendency of the swivel to "run-out" as in the prior art. Dresser gasket 37 serves only to seal the confronting surfaces of ring 34 and the encompassed pipe. The seal carrying ring 34 may be tightened as necessary to compensate for play between the swivel and the pipe without affecting the rotatability of thw swivel outer race. Moreover, gasket 37 does not function to hold the seal ring unit stationary, since the confronting swivel member 30, to which it is locked is held rotationally stationary by locking pin 32. The torque resistance within the swivel is unaffected by the packing gaskets 37, while gaskets 43 and 40 need be only tight enough to prevent fluid leaks and only normal rotary seals need be provided between the swivel inner and outer members as at 44. This is the result of functional segregation of the seal ring unit from the swivel outer race.

The invention may be modified in various respects as will occur to those skilled in the art, and the exclusive use of all modifications as come within the scope of the appended claims is contemplated.

What is claimed is:

1. The combination with first and second conduits of swivel bearing means sealingly interconnecting the same, said bearing means having inner and outer swivelling members, respectively sealingly secured to said conduits, means loosely securing said inner swivelling member to said first conduit, a seal-carrying ring encompassing and slightly spaced from said first conduit adjacent to said inner swivelling member, means sealing securing said seal-carrying ring to said inner swivelling member, a yieldable sealing gasket interposed between said seal-carrying ring and said first conduit, and means to adjust the tightness of said gasket to avoid leakage between said first conduit and said inner swivelling member without affecting the ease of movement of said outer swivelling member and said second conduit.

2. The combination described in claim 1 in which said means to adjust the tightness of said gasket compises a seal adjusting ring adjustably mounted on said seal-carrying ring.

3. The combination described in claim 1 in which said means loosely securing said first swivel bearing member to said first conduit comprises a recess in the wall of said first conduit and a pin projecting from said first bearing member and loosely received in said recess for accomodating limited wobble of said swivel bearing and said second conduit relative to said first conduit.

4. The combination described in claim 3 in which said seal carrying ring securing means comprises a shouldered ring encompassing and overlying said seal carrying ring and threaded means securing said returning ring to said inner swivel bearing member.

* * * * *

UNITED STATES PATENT AND TRADEMARK OFFICE
CERTIFICATE OF CORRECTION

PATENT NO. : 4,103,942
DATED : August 1, 1978
INVENTOR(S) : William L. Kiely and Kristen I. Pedersen It is certified that error appears in the above-identified patent and that said Letters Patent are hereby corrected as shown below:

Col. 1, line 50 after "adjustable" there should appear --. Resilient mastic caulking --.

Col. 2, line 2, after "which" there should be inserted -- forms the chamber 7a and Col. 2, line 3, "7a" should read -- 7b --.

Col. 2, line 23, "for instance" should be omitted.

Col. 2, line 40, after "seal-retaining" there should be inserted -- and adjustable --.

Col. 2, line 43, after "is" there should be inserted -- adjustably --.

Col. 4, line 24 (Claim 4) "returning" should read -- retaining --.

Col. 1 in heading, the Assignee should read, Sofec, Inc., Texas.

Signed and Sealed this

Twentieth Day of March 1979

[SEAL]

Attest:

RUTH C. MASON
*Attesting Officer*

DONALD W. BANNER
*Commissioner of Patents and Trademarks*